(12) United States Patent
Gallagher et al.

(10) Patent No.: US 9,980,250 B2
(45) Date of Patent: *May 22, 2018

(54) METHOD AND SYSTEM FOR WIFI ACCESS POINT UTILIZING FULL SPECTRUM CAPTURE (FSC)

(71) Applicant: Maxlinear, Inc., Carlsbad, CA (US)

(72) Inventors: Timothy Gallagher, Encinitas, CA (US); Curtis Ling, Carlsbad, CA (US); Alan Trerise, Las Gatos, CA (US); Kishore Seendripu, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 14/839,201

(22) Filed: Aug. 28, 2015

(65) Prior Publication Data

US 2016/0057809 A1 Feb. 25, 2016

Related U.S. Application Data

(63) Continuation of application No. 13/862,345, filed on Apr. 12, 2013, now Pat. No. 9,125,185.

(Continued)

(51) Int. Cl.
*H04W 4/00* (2018.01)
*H04W 72/04* (2009.01)
*H04W 16/02* (2009.01)
*H04W 84/12* (2009.01)
*H04W 88/08* (2009.01)

(52) U.S. Cl.
CPC ........... *H04W 72/04* (2013.01); *H04W 16/02* (2013.01); *H04W 84/12* (2013.01); *H04W 88/08* (2013.01)

(58) Field of Classification Search
None
See application file for complete search history.

(56) References Cited

U.S. PATENT DOCUMENTS 6,772,437 B1 8/2004 Cooper et al.
9,414,184 B2 * 8/2016 Ling ..................... H04W 4/008
(Continued)

OTHER PUBLICATIONS

International Search Report and the Written Opinion of the International Searching Authority, in Application No. PCT/US2013/036379, dated Jun. 17, 2013. 13 pages.

*Primary Examiner* — Willie J Daniel, Jr.
(74) *Attorney, Agent, or Firm* — McAndrews, Held & Malloy, Ltd.

(57) ABSTRACT

A WiFi access point (AP) includes a receive radio frequency (RF) front end and a baseband processor that controls operation of the receive RF front end. The RF front end captures signals over a wide spectrum that includes a plurality of WiFi frequency bands (2.4 GHz and 5 GHz) and channelizes one or more WiFi channels from the captured signals. The baseband processor combines a plurality of blocks of WiFi channels to create one or more aggregated WiFi channels. The receive RF front end may be integrated on a first integrated circuit and the baseband processor may be integrated on a second integrated circuit. The first and second integrated circuits may be integrated on a single package. The RF front end and the baseband processor may be integrated on a single integrated circuit. The WiFi access point comprises a routing module that is communicatively coupled to the baseband processor.

19 Claims, 12 Drawing Sheets

Related U.S. Application Data

(60) Provisional application No. 61/623,248, filed on Apr. 12, 2012.

(56) References Cited

U.S. PATENT DOCUMENTS

| | | |
|---|---|---|
| 2001/0055319 A1 | 12/2001 | Quigley et al. |
| 2007/0060158 A1 | 3/2007 | Medepalli et al. |
| 2009/0098844 A1 | 4/2009 | Anandakumar et al. |
| 2010/0085921 A1 | 4/2010 | Wu et al. |
| 2011/0109811 A1 | 5/2011 | Brandsma et al. |
| 2011/0149768 A1 | 6/2011 | Kang et al. |
| 2011/0188544 A1 | 8/2011 | Ponnuswamy |
| 2011/0242984 A1 | 10/2011 | Ponnuswamy |
| 2013/0195073 A1 | 8/2013 | Chen et al. |

* cited by examiner

METHOD AND SYSTEM FOR WIFI ACCESS POINT UTILIZING FULL SPECTRUM CAPTURE (FSC)

CROSS-REFERENCE TO RELATED APPLICATIONS/INCORPORATION BY REFERENCE

This application is a continuation of U.S. patent application Ser. No. 13/862,345, which was filed on Apr. 12, 2013 and which claims benefit of priority to U.S. Provisional Application Ser. No. 61/623,248, which was filed on Apr. 12, 2012.

This application also makes reference to:
U.S. application Ser. No. 13/485,003 filed on May 31, 2012;
U.S. application Ser. No. 13/336,451 filed on Dec. 23, 2011:
U.S. application Ser. No. 13/607,916 filed on Sep. 10, 2012;
U.S. application Ser. No. 13/857,776 filed on Apr. 5, 2013;
U.S. application Ser. No. 13/862,339 filed on Apr. 12, 2013;
U.S. application Ser. No. 13/862,336 filed on Apr. 12, 2013;
U.S. application Ser. No. 13/356,265, which was filed on Jan. 23, 2012; and
U.S. Pat. No. 8,010,070, (application Ser. No. 12/247, 908), which issued on Aug. 30, 2011, discloses exemplary Low-Complexity Diversity Using Coarse FFT and Coarse Sub-band-wise Combining.

Each of the above referenced applications is hereby incorporated herein by reference in its entirety.

FIELD OF THE INVENTION

Certain embodiments of the invention relate to wireless communication. More specifically, certain embodiments of the invention relate to a method and system for WiFi access point utilizing full spectrum capture.

BACKGROUND OF THE INVENTION

WiFi Signals occupy bandwidth in two non-contiguous spectral bands in the 2.4 and 5 GHz regions of the frequency spectrum.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for WiFi access point utilizing full spectrum capture, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
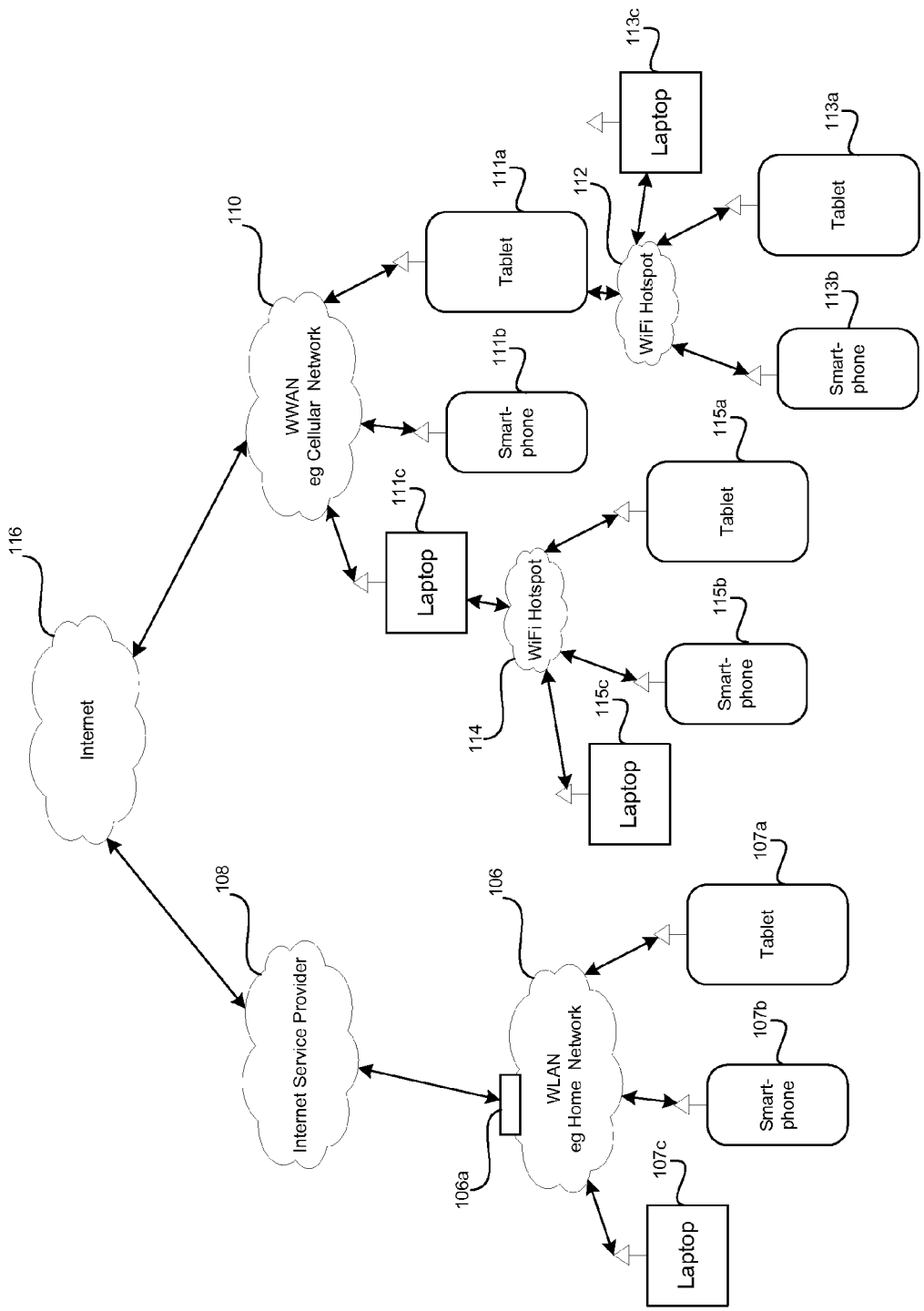
FIG. 1A is a block diagram of an exemplary system that comprises WiFi devices that communicate utilizing full spectrum capture, in accordance with an embodiment of the invention.

Certain embodiments of the invention may be found in a method and system for WiFi access point utilizing full spectrum capture (FSC). In various aspects of the invention, a WiFi access point or router comprises a receive radio frequency (RF) front end and a baseband processor. The baseband processor is enabled to control operation of the receive RF front end. The RF front end is operable to capture signals over a wide spectrum that includes one or more WiFi frequency bands. The WiFi frequency bands may comprise, for example, a 2.4 GHz WiFi frequency band and a 5 GHz WiFi frequency band. The various aspects and embodiments of the invention are not limited to the 2.4 and 5 GHz frequency bands and may be utilized with other frequency bands without departing from the spirit and/or scope of the invention. The RF front end is operable to channelize one or more WiFi channels from the captured signals. The baseband processor is operable to combine a plurality of blocks of WiFi channels to create one or more aggregated WiFi channels. Aggregating also comprises capturing and aggregating WiFi channels from a plurality of non-contiguous WiFi frequency bands and keeping the resulting aggregated WiFI channels as separate logical channels. For example, the single FSC WiFi receiver may be operable to capture a plurality of non-contiguous 100 MHz bands and aggregate them as separate logical WiFi channels. The blocks of WiFi channels may comprise the extracted one or more WiFi channels and/or other WiFi channels. The receive RF front end may be integrated on a first integrated circuit and the baseband processor may be integrated on a second integrated circuit. The first and second integrated circuits may be integrated on a single package. The RF front end and the baseband processor may be integrated on a single integrated circuit. The WiFi access point may comprise a routing module that is communicatively coupled to the baseband processor. The baseband processor may be operable to diversity process the channelized one or more WiFi channels and duty cycle communication traffic across a plurality of the aggregated WiFi channels. The baseband processor may be operable to assign one of the aggregated WiFi channels as a dedicated channel for handling traffic for a WiFi enabled communication device. The baseband processor may be operable to dynamically reassign the assigned one of the aggregated WiFi channels as a dedicated channel for handling traffic for another WiFi enabled communication device.

The WiFi access point comprises a routing module that is communicatively coupled to the baseband processor. The baseband processor may diversity process the channelized one or more WiFi channels and duty cycle communication traffic across a plurality of the aggregated WiFi channels. The baseband processor may assign one of the aggregated WiFi channels as a dedicated channel for handling traffic for a WiFi enabled communication device. The baseband processor may dynamically reassign the assigned one of the aggregated WiFi channels as a dedicated channel for handling traffic for another WiFi enabled communication device. WiFi is short for wireless fidelity and refers to any wireless local area network device, which is based on the IEEE 802.11 standard.

FIG. 1A is a block diagram of an exemplary system that comprises WiFi devices that communicate utilizing full spectrum capture, in accordance with an embodiment of the invention. Referring to FIG. 1A, there is shown a wireless local area network (WLAN) 106, an Internet service provide (ISP) network 108, a wireless wide area network (WWAN) 110 and the Internet 116. Also shown are WiFi hotspot networks 112 and 114. FIG. 1A also illustrates a plurality of WiFi enabled communication devices comprising tablets 107a, 111a, 113a, 115a, Smartphones 107b, 111b, 113b, 115b and laptops 107c, 111c, 113c, 115c. FIG. 1A also illustrates a WiFi enabled communication device comprising broadband router or access point 106a.

The tablet 107a, the Smartphone 107b and the laptop 107c may be communicatively coupled to the WLAN 106. The tablet 107a, the Smartphone 107b and the laptop 107c may be collectively referenced as WiFi enabled communication devices 107. Each of the WiFi enabled communication devices 107 may comprise a suitable logic, circuitry interfaces and/or code that may be operable to communicate utilizing WiFi. In this regard, each of the WiFi enabled communication devices 107 may comprise a single transceiver device that may be operable to capture signals over a very wide spectrum from different WiFi spectral bands utilizing full spectrum capture.

The tablet 111a, the Smartphone 111b and the laptop 111c may be communicatively coupled to the WWAN 110. The tablet 111a, the Smartphone 111b and the laptop 111c may be collectively referenced as WiFi enabled communication devices 111. Each of the WiFi enabled communication devices 111 may comprise a suitable logic, circuitry interfaces and/or code that may be operable to communicate utilizing WiFi. In this regard, each of the WiFi enabled communication devices 111 may comprise a single transceiver device that may be operable to capture signals over a very wide spectrum from different WiFi spectral bands utilizing full spectrum capture.

The tablet 113a may comprise a WiFi hotspot 112. The tablet 113a, the Smartphone 113b and the laptop 113c may be communicatively coupled to the WiFi hotspot 112. The tablet 113a, the Smartphone 113b and the laptop 113c may be collectively referenced as WiFi enabled communication devices 113. Each of the WiFi enabled communication devices 113 may comprise a suitable logic, circuitry interfaces and/or code that may be operable to communicate utilizing WiFi. In this regard, each of the WiFi enabled communication devices 113 may comprise a single transceiver device that may be operable to capture signals over a very wide spectrum from different WiFi spectral bands utilizing full spectrum capture. While tablet 113a is shown as comprising the WiFi hotspot 112, any one of the WiFi enabled communication devices 113 (or alternatively an access point or a router) may be used to establish a WiFi hotspot 112.

The tablet 115a may comprise a WiFi hotspot 114. The tablet 115a, the Smartphone 115b and the laptop 115c may be communicatively coupled to the WiFi hotspot 114. The tablet 115a, the Smartphone 115b and the laptop 115c may be collectively referenced as WiFi enabled communication devices 115. Each of the WiFi enabled communication devices 115 may comprise a suitable logic, circuitry interfaces and/or code that may be operable to communicate utilizing WiFi. In this regard, each of the WiFi enabled communication devices 115 may comprise a single transceiver device that may be operable to capture signals over a very wide spectrum from different WiFi spectral bands utilizing full spectrum capture. While tablet 115a is shown as comprising the WiFi hotspot 114, any one of the WiFi enabled communication devices 115 (or alternatively an access point or a router) may be used to establish the WiFi hotspot 114.

The WLAN 106 may comprise suitable devices and/or interfaces that may be utilized by the plurality of WiFi enabled communication devices 107 to access the Internet 116 via the ISP network 108. For example, the WLAN 106 may comprise the WiFi enabled broadband access point or router 106a that is operable to provide broadband connectivity to the ISP 108 and WLAN connectivity to each of the WiFi enabled communication devices 107. The broadband connectivity may be provided by, at least in part, cable, satellite and digital subscriber line (DSL) services, for example. The WLAN 106 may also enable the WiFi enabled communication devices 107 to communicate with each other.

The WiFi enabled broadband access point or router 106a may comprise suitable logic, circuitry, interfaces and/or code that may be operable to provide broadband connectivity to the ISP network 108 and WiFi connectivity to each of the WiFi enabled communication devices 107. In this regard, the WiFi enabled broadband access point or router 106a enables each of the tablet 107a, the Smartphone 107b and the laptop 107c to communicate utilizing WiFi to access the services and/or data on the Internet 116 via the ISP network 108 and the WLAN 106.

The ISP network 108 may comprise suitable devices and/or interfaces that may be coupled to the Internet 116 and provide access to the Internet 116 for various communication devices. The ISP network 108 may comprise, for example, a cable service provider network, a satellite service provider network and a DSL service provider network. In this regard, the ISP network 108 provides access to the Internet 116 for the WiFi enabled communication devices 107. For example, the ISP network 108 provides access to the services and/or data on the Internet 116 for each of the tablet 107a, the Smartphone 107b and the laptop 107c via the WLAN 106.

The wireless wide area network 110 may comprise suitable devices and/or interfaces that may be coupled to the Internet 116 and provide access to the Internet 116 for various communication devices. The wireless wide area network 110 may comprise, for example, a cellular service provider (e.g., LTE) and/or a broadband service provider such as, for example, a WiMax (802.16) or WiFi service provider. In this regard, the wireless wide area network 110 provides access to the Internet 116 for the WiFi enabled communication devices 111. For example, the wireless wide area network 110 provides access to the services and/or data on the Internet 116 for each of the tablet 111a, the Smartphone 111b and the laptop 111c.

The Internet 116 may comprise suitable devices and/or interfaces that may comprise a plurality of servers, which store and serve various data and hosts various Internet services. The ISP 108 may be utilized by the WiFi enabled communication devices 107 to access the Internet services and/or data via the WLAN 106. The WWAN 110 may be utilized by the WiFi enabled communication devices 111 to access the Internet services and/or data. The Internet 116 is also accessible to the WiFi enabled communication devices 113 via the WiFi hotspot 112 and the WWAN 110. Similarly, Internet 116 is also accessible to the WiFi enabled communication devices 115 via the WiFi hotspot 114 and the WWAN 110.

In operation, each of the WiFi enabled communication devices 107, 111, 113 and 115 and the WiFi enabled broadband access point or router 106a are operable to utilize a single WiFi radio to capture WiFi signals over a wide spectrum comprising a plurality of WiFi frequency bands. Instead of having different radios to handle the different WiFi frequency bands, each of the WiFi enabled communication devices 107, 111, 113 and 115 and WiFi enabled broadband router 106a are operable to utilize a single full spectrum capture receiver that is operable to capture a very large bandwidth comprising the different WiFi frequency bands. In accordance with various embodiments of the invention, the different WiFi frequency bands may be contiguous WiFi frequency bands or non-contiguous WiFi frequency bands. For example, the WiFi signals may occupy a 2.4 GHz band ranging from approximately 2.4-2.9 GHz and a 5 GHz band ranging from approximately 4.9-5.9 GHz. Accordingly, although the WiFi frequency bands are non-contiguous, the single WiFi receiver is utilized to capture the WiFi signals from the corresponding WiFi frequency bands.

Figure 1B:
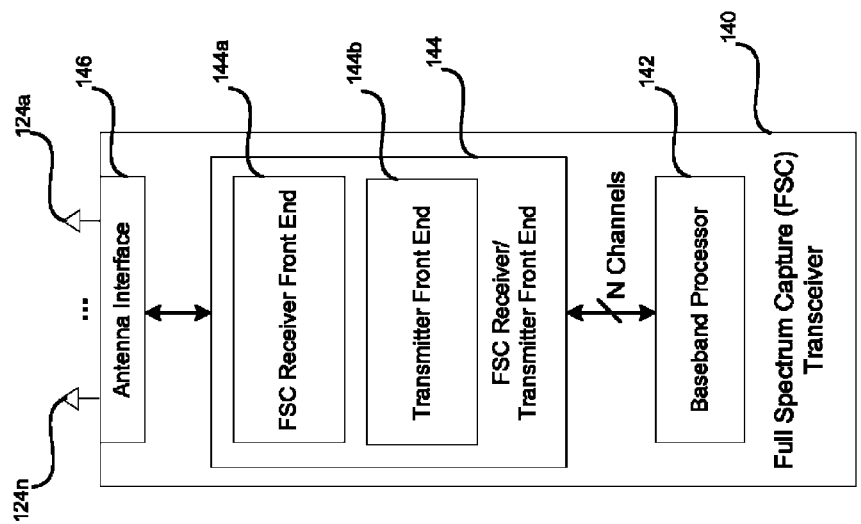
FIG. 1B is a high-level block diagram of an exemplary full spectrum capture transceiver device, in accordance with an embodiment of the invention.

FIG. 1B is a high-level block diagram of an exemplary full spectrum capture transceiver device, in accordance with an embodiment of the invention. Referring to FIG. 1B, there is shown a full spectrum capture transceiver device 140. The full spectrum capture transceiver device 140 comprises a plurality of antennas 124a, . . . , 124n, a baseband processor 142, a full spectrum capture receiver and transmitter front end 144 and an antenna interface 146. The full spectrum capture receiver and transmitter front end 144 comprises a full spectrum capture receiver front end 144a and a transmitter front end 144b.

The plurality of antennas 124a, . . . , 124n may comprise a plurality of antennas that are utilized to capture a plurality of wireless signals over a wide portion of the spectrum that is allocated for WiFi. The resulting captured plurality of wireless signals are communicated via the antenna interface 146 to the full spectrum capture receiver and transmitter front end 144 for processing. In accordance with an embodiment of the invention, the plurality of antennas 124a, . . . , 124n may comprise a diversity antenna system, such as, for example, plurality of phased array antennas. U.S. application Ser. No. 13/857,776, which was filed on Apr. 5, 2013, discloses a plurality of phased array antennas and is hereby incorporated herein by reference in its entirety.

The antenna interface 146 may comprise suitable logic, circuitry, interfaces and/or code that may be operable to control and/or configure operation of the plurality of antennas 124a, . . . , 124n.

The full spectrum capture receiver front end 144a may comprise suitable logic, circuitry, interfaces and/or code that may be operable to receive and process WiFi signals utilizing full spectrum capture. In this regard, the full spectrum capture receiver front end 144a may be operable to capture signals over a wide spectrum comprising a plurality of WiFi frequency bands and extract WiFi signals for one or more WiFi channels from the captured signals. The full spectrum capture receiver front end 144a may be operable to capture signals over the 2.4 GHz and the 5 GHz WiFi frequency bands and extract one or more WiFi channels.

The transmitter front end 144b may comprise suitable logic, circuitry, interfaces and/or code that may be operable to transmit WiFi signals in accordance with the one or more WLAN protocols. The transmitter front end 144b may be operable to synthesize signals over a wide spectrum comprising one or more WiFi freq. bands.

The baseband processor 142 may comprise suitable logic, circuitry, interfaces and/or code that may be operable to provide baseband processing of the WiFi signals that are demodulated by the full spectrum capture receiver front end 144a. The baseband processor 142 may also be operable to process information for transmission. The processed information may be communicated to the transmitter front end, where it is modulated and transmitted via the one or more the plurality of antennas 124a, . . . , 124n. The baseband processor 142 may also be operable to control operation of the full spectrum capture transceiver device 140. In this regard the baseband processor 142 may be operable to control operation of the plurality of antennas 124a, . . . , 124n, the antenna interface 146, and the full spectrum capture receiver front end 144a and a transmitter front end 144b, which includes the full spectrum capture receiver front end 144a and the transmitter front end 144b. The baseband processor may be operable to process digitized data for each of the N WiFi channels, which may be handled by the full spectrum capture receiver and transmitter front end 144.

In operation, the antenna interface 146 may be operable to control and/or configure operation of the plurality of antennas 124a, . . . , 124n for capturing the signals over a wide spectrum comprising a plurality of WiFi frequency bands.

The full spectrum capture receiver front end 144a may comprise suitable logic, circuitry, interfaces and/or code that may be operable to receive and process WiFi signals utilizing full spectrum capture. In this regard, the full spectrum capture receiver front end 144a may be operable to capture signals over a wide spectrum comprising a plurality of WiFi frequency bands and extract WIFI signals for one or more WiFi channels from the captured signals. The full spectrum capture receiver front end 144a may be operable to concurrently capture WiFi signals over the 2.4 GHz and the 5 GHz WiFi frequency bands and extract one or more WiFi channels from the corresponding captured WiFi signals.

The full spectrum capture transceiver device 140 may be operable to aggregate or bond a plurality of WiFi channels in order to produce a high data rate WiFi channel. In various embodiment of the invention, a single frequency may be assigned or allocated to each WiFi enabled communication device. In this regard, a single FSC WiFi access point (AP) may appear as if it were multiple WiFi access points. The client device, namely, the WiFi enabled communication device, does not need to be modified to benefit from this increased capacity. There may be instances when both the client device and the AP are FSC enabled and are operable to bond a plurality of channels and transmit on the bonded channels. In this regard, transmission may occur in a duty cycle mode utilizing burst mode and sleep mode to optimize power consumption. The FSC WiFi devices may transmit bursts then go to sleep between bursts.

In an exemplary embodiment, a WiFi enabled communication device that is a client device, needs to know the transmit pattern/times of the WiFi AP. The client device is operable to notify the AP that it has data to transmit. The notification may occur in an acknowledgement (ACK) packet. The AP and the client device may be operable to agree on a transmit schedule. In this regard, the AP and client device, namely the WiFi enabled communication device, may agree on when the beacon frames will occur since the beacon frames are utilized for timing. In addition (or alternatively), the AP may transmit beacons at periodic times known to the client device, and the client device synchronizes to receive each beacon frame or some subset of beacon frames (every other, every third, etc.). Alternatively, a beaconless embodiment may be employed. In any event, the AP and client device may operate in accordance with one or more essential or non-essential sections or aspects of the IEEE 802.11 standard.

Aspects of full spectrum capture may be found in U.S. application Ser. No. 13/485,003 filed May 31, 2012, U.S. application Ser. No. 13/336,451 filed on Dec. 23, 2011 and U.S. application Ser. No. 13/607,916 filed Sep. 10, 2012. Each of these applications is hereby incorporated herein by reference in its entirety.

U.S. application Ser. No. 13/356,265, which was filed on Jan. 23, 2012 disclosures operation of an exemplary full spectrum receiver and is hereby incorporated herein by reference in its entirety.

Figure 1C:
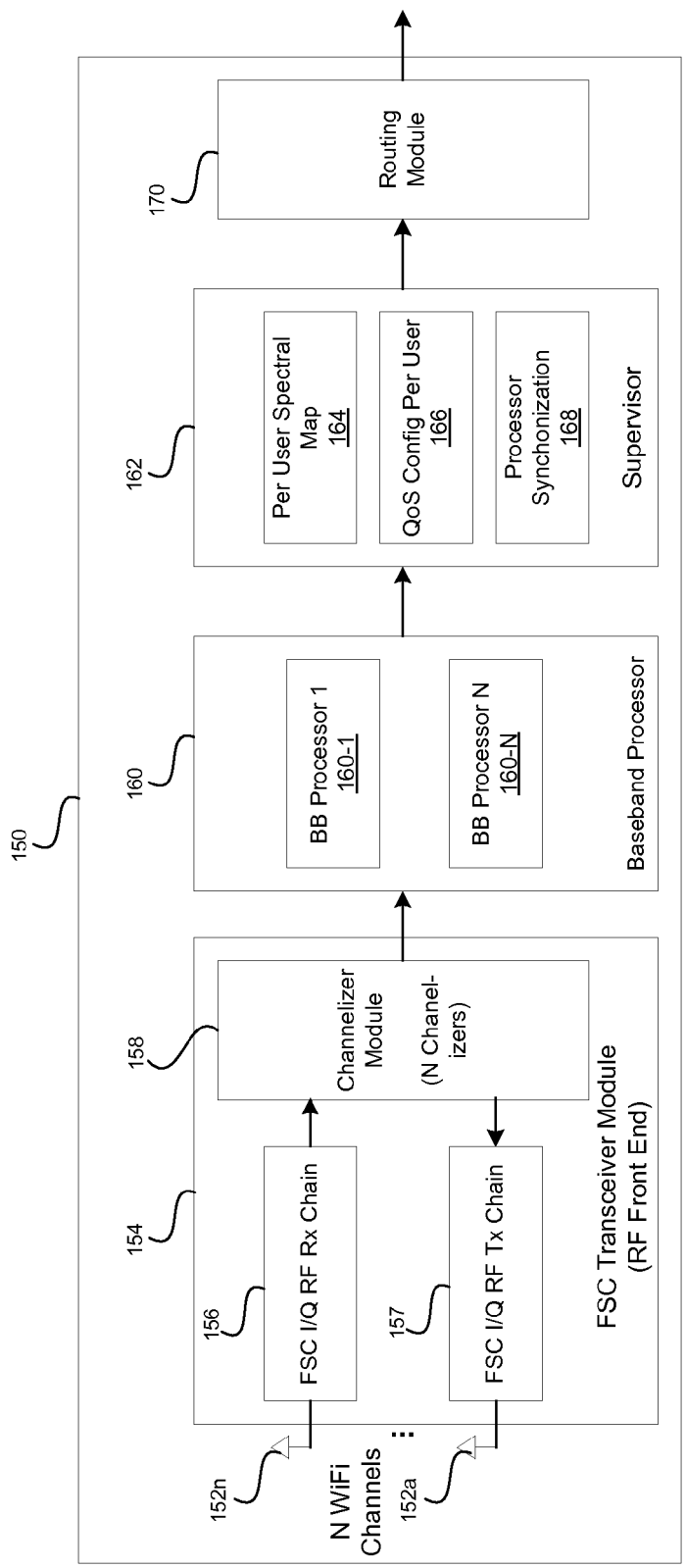
FIG. 1C is a diagram of an exemplary full spectrum Access point and/or router that is operable to concurrently handle WiFi signals from a plurality of WiFi frequency bands, in accordance with an embodiment of the invention.

FIG. 1C is a diagram of an exemplary full spectrum capture Access point and/or router that is operable to concurrently handle WiFi signals from a plurality of WiFi frequency bands, in accordance with an embodiment of the invention. Referring to FIG. 1C, there is shown a full spectrum capture access point (AP) or router 150. The full spectrum capture Access point and/or router 150 may comprise a full spectrum capture transceiver module 154, a baseband processor module 160, a supervisor module 162 and a routing module 170. The full spectrum capture transceiver module 154 may comprise a full spectrum capture I/Q RF receive (Rx) chain module 156, an I/Q RF transmit (Tx) chain module 157 and a channelizer module 158. The baseband processor module 160 may comprise a plurality of baseband processors 160-1, . . . , 160-N. The supervisor module 162 may comprise a per user spectral map module 164, a QoS configuration per user module 166, and a processor synchronization module 168. The full spectrum capture Access point and/or router also comprises a plurality of antennas 152a, . . . , 152n.

The full spectrum capture I/Q RF receive (Rx) chain module 156 is part of the full spectrum capture transceiver module 154 and may comprise suitable logic, circuitry, interfaces and/or code that may be operable to capture signals over a wide spectrum comprising a plurality of WiFi frequency bands and demodulate them. In this regard, the full spectrum capture I/Q RF receive (Rx) chain module 156 may comprise a plurality of receive processing chains that may be operable to demodulate different portions of the signals in the captured WiFi frequency bands. The captured spectrum may comprise WiFi signals and non-WiFi signals. The full spectrum capture I/Q RF receive (Rx) chain module 156 may be operable to discriminate between the WiFi signals and non-WiFi signals and accordingly, filter out the unwanted or undesirable non-WiFi signals. The resulting filtered signals may be digitized and channelized into a corresponding plurality of frequency bins.

The I/Q RF transmit (Tx) chain module 157 may be part of the full spectrum capture transceiver module 154 and may comprise suitable logic, circuitry, interfaces and/or code that may be operable to handle modulation of signals that are to be transmitted.

The channelizer module 158 is part of the full spectrum capture transceiver module 154 and may comprise suitable logic, circuitry, interfaces and/or code that may be operable to handle the channelization of signals for a plurality of each of the processing chains in the full spectrum capture transceiver module 154. In this regard, during reception, the channelizer module 158 may be operable to channelize digitized data from each of the corresponding plurality of full spectrum capture I/Q RF receive (Rx) chains in the full spectrum capture I/Q RF receive (Rx) chain module 156 into a plurality of frequency bins. During transmission, the channelizer module 158 may be operable to channelize digital data for transmission into a plurality of frequency bins for each of the corresponding I/Q RF transmit (Tx) chains in the I/Q RF transmit (Tx) chain module 157.

The baseband processor module 160 may comprise suitable logic, circuitry, interfaces and/or code that may be operable to process the demodulated baseband WiFi signals that generated from the full spectrum capture I/Q RF receive (Rx) chain module 156. The baseband processor 160 may also be operable to process information for transmission. In this regard, the processed information may be communicated to the full spectrum capture I/Q RF receive (Rx) chain module 156, where it is modulated and transmitted via one or more of the plurality of antennas 152a, . . . , 152n. The baseband processor 160 may also be operable to manage and control operation of the full spectrum capture Access point and/or router 150. In this regard the baseband processor 160 may be operable to manage and control operation of the plurality of antennas 152a, . . . , 152n, full spectrum capture transceiver module 154 including the full spectrum capture I/Q RF receive (Rx) chain module 156, the I/Q RF transmit (Tx) chain module 157 and the channelizer module 158, the supervisor module 162 and the routing module 170. The baseband processor 160 may be operable to handle the processing of digitized data for each of the N WiFi channels that may be handled by the full spectrum capture transceiver module 154. The baseband processor 160 may be substantially similar to the baseband processor 142 as illustrated in FIG. 1B.

The supervisor module 162 may comprise suitable logic, circuitry, interfaces and/or code that may be operable to manage the operation of the full spectrum capture Access point and/or router 150 on a per user basis. For example, the supervisor module 162 may be operable to handle the routing and QoS for packets for particular users.

The per user spectral map module 164 is part of the supervisor module 162 and may comprise suitable logic, circuitry, interfaces and/or code that may be operable to create a spectral map comprising the quality of various WiFi channels over the different WiFi frequency bands.

The quality of service (QoS) configuration per user module 166 is part of the supervisor module 162 and may comprise suitable logic, circuitry, interfaces and/or code that may be operable to control the quality of service that may be provided to each user.

The processor synchronization module 168 is part of the supervisor module 162 and may comprise suitable logic, circuitry, interfaces and/or code that may be operable to handle synchronization of sample rate and symbol timing across various WiFi channels and/or WiFi frequency bands that are utilized for communicating information by one or more users or WiFi enabled user devices. Since a common oscillator may be utilized to handle the different WiFi channels and the different WiFi frequency bands, this may simplify the task of dealing with a plurality of different sample rates, frequency offsets and other timing information. The processor synchronization module 168 may be operable to store frequency and/or timing offset information for a plurality of WiFi enabled user devices and utilize the stored frequency and/or timing offset information to synchronize the WiFi enabled user devices. The processor synchronization module 168 may be operable to handle the timing for a plurality of WiFi channels that may be aggregated to provide a desired bandwidth for communicating data.

The routing module 170 may comprise suitable logic, circuitry, interfaces and/or code that may be operable to handle the routing of ingress and egress packets that are handled by the full spectrum capture Access point and/or router 150.

In operation, the full spectrum capture Access point and/or router 150 may be operable to capture WiFi signals over a very large bandwidth and flexibly reconfigure the captured bandwidth in order to achieve a desired bandwidth. In this regard, the full spectrum capture Access point and/or router 150 is operable to capture a plurality of WiFi channels and flexibly aggregate the channel to provide a desired bandwidth. The spectrum resulting from the aggregated channels may be referred to as a virtual spectrum. One or more resulting aggregated WiFi channels may be referred to as high bandwidth WiFi channels. The full spectrum capture Access point and/or router 150 is operable to capture and aggregate contiguous and non-contiguous blocks of spectrum within a single WiFi frequency band and/or contiguous and non-contiguous blocks of spectrum within a plurality of WiFi frequency bands. For example, the full spectrum capture Access point and/or router 150 may be operable to capture and aggregate contiguous and non-contiguous blocks of spectrum within the 2.4 GHz band, contiguous and non-contiguous blocks of spectrum within the 5 GHz band or contiguous and non-contiguous blocks of spectrum within the 2.4 GHz band and also within the 5 GHz band. The resulting aggregated spectrum may appear as if it were a contiguous block of spectrum. The aggregated spectrum may be assigned to one or more users or user devices. In an exemplary embodiment of the invention, an aggregated block of WiFi spectrum may be shared among the mobile communication devices 107. In instances where the tablet 107a may require more bandwidth than the Smartphone 107b and the laptop 107c may not require any bandwidth, the WiFi enabled broadband router 106a may be operable to proportionately allocate the bandwidth for the aggregated block of WiFi spectrum between the tablet 107a and the Smartphone 107b.

In accordance with an embodiment of the invention, based on the number of channels that are being utilized to capture and aggregate the blocks of spectrum in the WiFi frequency band, various components in the full spectrum capture Access point and/or router 150 may operate in a duty cycle mode. For example, a portion of the I/Q RF receive (Rx) chains in the full spectrum capture I/Q RF receive (Rx) chain module 156, corresponding channelizers in the channelizer module 158 as well as corresponding baseband processors 160-1, . . . , 160-N in the baseband processor module 160 may be power cycled on when they are needed and power cycled off when they are not needed. The cycling of the power on and off to handle communication of data whenever needed may be referred to as time division power management.

In another embodiment of the invention, a portion of the I/Q RF receive (Rx) chains in the full spectrum capture I/Q RF receive (Rx) chain module 156, corresponding channelizers in the channelizer module 158 as well as corresponding baseband processors 160-1, . . . , 160-N in the baseband processor module 160 may be designated as broadcast lanes to handle broadcast traffic. The remaining portion of the I/Q RF receive (Rx) chains in the full spectrum capture I/Q RF receive (Rx) chain module 156, corresponding channelizers in the channelizer module 158 as well as corresponding baseband processors 160-1, . . . , 160-N in the baseband processor module 160 may be designated as common lanes. Based on the type of traffic, the lanes may be duty cycled on or off to handle the transfer of data.

In accordance with an embodiment of the invention, the broadcast lanes may be utilized for burst communication of traffic. The full spectrum capture Access point and/or router 150 may be operable to wakeup from a sleep mode and burst a large amount of data over one or more broadcast lanes. At the end of the data burst, the full spectrum capture Access point and/or router 150 may be operable to enter a sleep mode. During sleep mode, the full spectrum capture Access point and/or router 150 may be operable to monitor one or more common lanes. The common lanes may be utilized for management and control functions as well as communicating smaller amounts of data traffic. During sleep mode, the broadcast lanes may be shut down to save power.

Figure 1D:
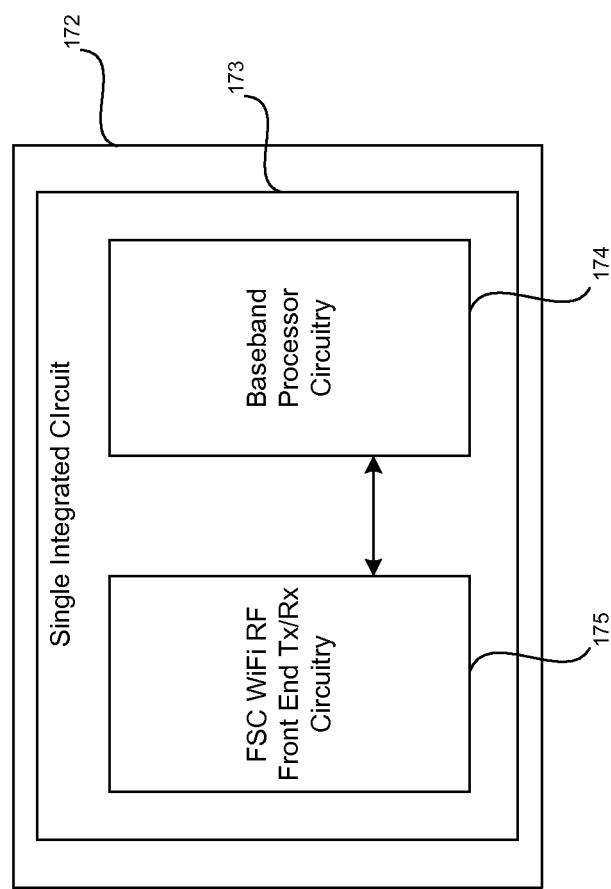
FIG. 1D is a high-level block diagram of an exemplary FSC WiFi integrated circuit comprising FSC WiFi RF front end transceiver circuitry and baseband processing circuitry, in accordance with an embodiment of the invention.

FIG. 1D is a high-level block diagram of an exemplary FSC WiFi integrated circuit comprising FSC WiFi RF front end transceiver circuitry and baseband processing circuitry, in accordance with an embodiment of the invention. Referring to FIG. 1D, there is shown an integrated circuit package 172, a FSC WiFi integrated circuit 173, baseband processor circuitry 174 and FSC WiFi RF front end transceiver (Tx/Rx) circuitry 175. The arrangement of FIG. 1D may be referred to as a single chip solution.

The baseband processor circuitry 174 and the FSC WiFi RF front end transceiver circuitry 175 may be integrated on the single FSC WiFi integrated circuit 173. The single FSC WiFi integrated circuit 173 may be packaged within the integrated circuit package 172.

Figure 1E:
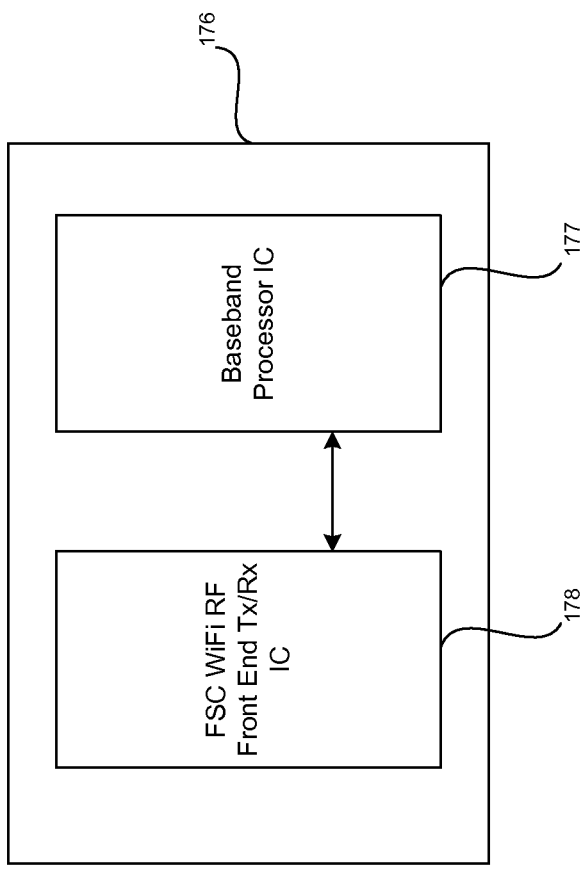
FIG. 1E is a high-level block diagram of an exemplary FSC WiFi RF front end transceiver integrated circuit and a baseband processing integrated circuit packaged on a single integrated circuit package, in accordance with an embodiment of the invention.

FIG. 1E is a high-level block diagram of an exemplary FSC WiFi RF front end transceiver integrated circuit and a baseband processing integrated packaged on a single integrated circuit package, in accordance with an embodiment of the invention. Referring to FIG. 1E, there is shown an integrated circuit package 176, a baseband processor integrated circuit 177 and a FSC WiFi RF front end transceiver (Tx/Rx) integrated circuit 177.

The baseband processor integrated circuit 177 and the FSC WiFi RF front end transceiver (Tx/Rx) integrated circuit 177 may be packaged within the single integrated circuit package 176. The arrangement of FIG. 1E may be referred to as a dual chip solution.

Figure 1F:
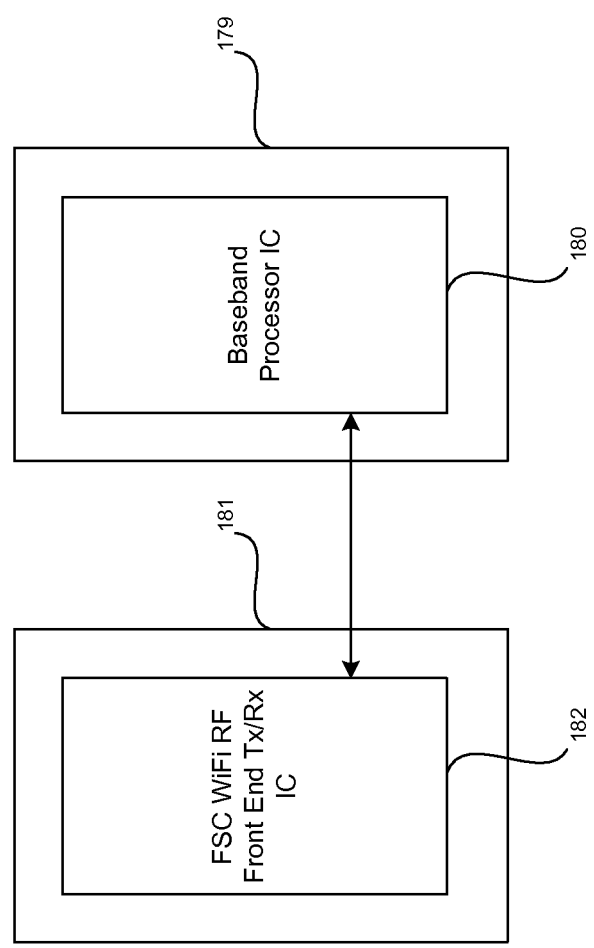
FIG. 1F is a high-level block diagram of an exemplary FSC WiFi RF front end transceiver integrated circuit and a baseband processing integrated circuit packaged on separate integrated circuit packages, in accordance with an embodiment of the invention.

FIG. 1F is a high-level block diagram of an exemplary FSC WiFi RF front end transceiver integrated circuit and a baseband processing integrated circuit packaged on separate integrated circuit packages, in accordance with an embodiment of the invention. Referring to FIG. 1F, there is shown an integrated circuit package 179, a baseband processor integrated circuit 180, and integrated circuit package 181 and a FSC WiFi RF front end transceiver (Tx/Rx) integrated circuit 181.

The baseband processor integrated circuit 180 may be packaged on the integrated circuit package 179. The FSC WiFi RF front end transceiver (Tx/Rx) integrated circuit 182 may be packaged within the integrated circuit package 181. The arrangement of FIG. 1F may be referred to as a dual chip solution or separate chips solution.

Figure 2:
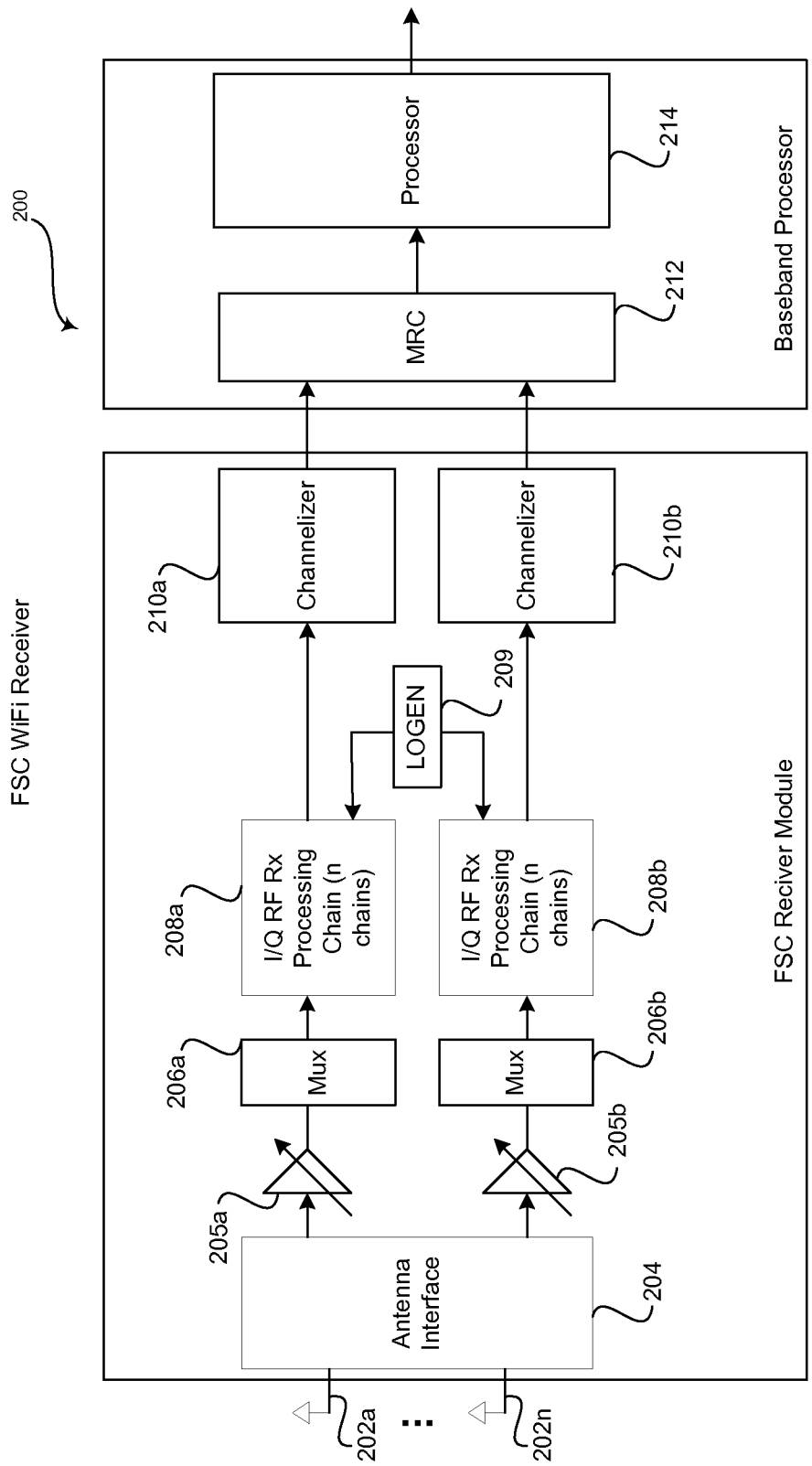
FIG. 2 is a block diagram of an exemplary diversity WiFi receiver that utilizes full spectrum capture, in accordance with an embodiment of the invention.

FIG. 2 is a block diagram of an exemplary diversity WiFi receiver that utilizes full spectrum capture, in accordance with an embodiment of the invention. Referring to FIG. 2, there is shown a diversity WiFi receiver 200. The diversity WiFi receiver 200 may comprise antennas 202a, . . . , 202n, antenna interface 204, variable gain amplifiers 205a, 205b, multiplexers 206a, 206b, I/Q RF receive processing chain modules 208a, 208b, local oscillator generator (LOGEN) 209, channelizers 210a, 210b, maximum ratio combiner 212 and a baseband processor 214. The variable gain amplifier 205a, the multiplexer 206a, the I/Q RF receive processing chain module 208a, and the channelizer 210a may be operable to handle the processing of signals received via the antennas 202a, . . . , 202n. The variable gain amplifier 205b, the multiplexer 206b, the I/Q RF receive processing chain module 208b, and the channelizer 210b may be operable to handle the processing of signals received via the antenna 202b.

The antennas 202a, . . . , 202n may comprise suitable logic, circuitry and/or interfaces that are operable to receive WiFi signals. The characteristics of the antennas 202 (e.g., coil) may be such that they may perform filtering functions and, in those instances, transmit and/or receive filters may not be needed.

The antenna interface 204 may comprise suitable logic, circuitry, interfaces and/or code that may be operable to interface with the antennas 202a, . . . , 202n with the corresponding processing paths in the diversity WiFi receiver 200.

The variable gain amplifiers 205a, 205b may comprise suitable logic, circuitry, interfaces and/or code that may be operable to variably adjust a corresponding gain of the input signal from antenna interface 204. For example, the variable gain amplifiers 205a may be operable to amplify and/or buffer the signal received via the antennas 202a, . . . , 202n from the antenna interface 204. The variable gain amplifiers 205a, 205b may operate in different modes that enable capturing of different size bandwidths. For example, the variable gain amplifiers 205a, 205b may be configured to capture narrowband signals or broadband signals.

The multiplexers 206a, 206b may comprise suitable logic, circuitry, interfaces and/or code that may be operable to select from among a plurality of n processing RF receive (RX) chains in the I/Q RF receive processing chain modules 208a, 208b, respectively, where n is an integer. For example, the multiplexers 206a may be operable to select which of the plurality of n processing RF receive (RX) chains within the I/Q RF receive processing chain modules 208a are to be utilized for demodulation of the signal output from the multiplexer 206a. Similarly, the multiplexers 206b may be operable to select which of the plurality of n processing RF receive (RX) chains within the I/Q RF receive processing chain modules 208b are to be utilized for demodulation of the signal output from the multiplexer 206b. The baseband processor 214 may be operable to control which of the plurality of n processing RF receive (RX) chains in the n I/Q RF receive processing chain modules 208a, 208b may be selected.

The I/Q RF receive processing chain modules 208a, 208b may comprise suitable logic, circuitry, interfaces and/or code that may be operable to demodulate the signals that are output from the multiplexer 206a, 206b, respectively. Each of the I/Q RF receive processing chain modules 208a, 208b may comprise a plurality of n I/Q RF receive processing chains. The baseband processor 214 may be operable to select which of the I/Q RF receive processing chain modules 208a, 208b are to be utilized to demodulate the signals that are output from the multiplexers 206a, 206b. For example, the I/Q RF receive processing chain module 208a may be utilized to demodulate the signals that are output from the multiplexer 206a, while the I/Q RF receive processing chain module 208b may be utilized to demodulate the signals that are output from the multiplexer 206b.

The LOGEN 209 may comprise suitable logic, circuitry, interfaces and/or code that may be operable to drive one or more oscillators within the I/Q RF receive processing chain modules 208a, 208b. The LO generator 209 may comprise, for example, one or more crystals, one or more direct digital synthesizers, and/or one or more phase-locked loops.

The channelizers 210a, 210b may comprise suitable logic, circuitry, interfaces and/or code that may be operable to channelize the demodulated signals that are output from the n I/Q RF receive processing chain 208a, 208b, respectively. The channelizers 210a, 210b may be operable to separate each of the corresponding channels into a plurality of frequency bins. The output of the channelizers 210a, 210b may be combined by a combiner. In accordance with an embodiment of the invention, the channelization may be achieved via one or more digital filtering algorithms and/or other digital signal processing algorithms. Each of the channelizers 210a, 210b may comprise a plurality of band selection filters that are operable to process the corresponding output from the plurality of n processing RF receive (RX) chains in the n I/Q RF receive processing chain modules 208a, 208b in order to recover a corresponding one of the a plurality of selected frequency bands or frequency bins. The granularity of the channelizers 210a, 210b may be programmable. In this regard, the channelizers 210a, 210b may be programmed to handle channels of varying bandwidth. For example, the channelizers 210a, 210b may be programmed to handle 20 MHz and/or 40 MHz channels.

The maximum ratio combiner 212 may comprise suitable logic, circuitry, interfaces and/or code that may be operable to combine the channels that are output from the channelizers 210a, 210b. For example, maximum ratio combiner 212 may be operable to utilize, for example, a coarse FFT processing that employs a low complexity diversity using coarse FFT and subband-wise combining. The coarse FFT processing may optimally combine the signals from a plurality of frequency bins for multiple antennas and accordingly, generate an improved maximum ratio combined (MRC) co-phased signals.

U.S. Pat. No. 8,010,070, (application Ser. No. 12/247, 908), which issued on Aug. 30, 2011, discloses exemplary Low-Complexity Diversity Using Coarse FFT and Coarse Sub-band-wise Combining, and is hereby incorporated herein by reference in its entirety.

The maximum ratio combiner 212 may also be operable to utilize channel stacking and/or band stacking of the plurality of frequency bins. In this regard, in one embodiment of the invention, a plurality of WiFi frequency bands or WiFi frequency sub-bands may be stacked utilizing band stacking. In another embodiment of the invention, a plurality of WiFi channels in one or more WiFi frequency bands may be stacked utilizing channel stacking. For example, a plurality of WiFi channels in the 2.4 GHz WiFi band and/or in the 5 GHz WiFi frequency band may be stacked utilizing channel stacking. In other embodiments of the invention, a hybrid or flexible stacking scheme may also be utilized. Additional details regarding stacking may be found in U.S. application Ser. No. 13/762,939, filed on Feb. 8, 2013, which is hereby incorporated herein by reference in its entirety.

The baseband processor 214 may comprise suitable logic, circuitry, interfaces and/or code that may be operable to provide baseband processing on the channels that are generated from the maximum ratio combiner 212. The baseband processor 214 may also be operable to function as a controller for the diversity WiFi receiver 200. In this regard, the baseband processor 214 may be operable to control, configure and/or manage operation of one or more of the antenna interface 204, the variable gain amplifiers 205a, 205b, the multiplexers 206a, 206b, the I/Q RF receive processing chain modules 208a, 208b, the local oscillator generator (LOGEN) 209, the channelizers 210a, 210b, and the maximum ratio combiner 212. The baseband processor 214 may be operable to control, configure and/or manage operation of one or more of the components in the I/Q RF receive processing chain modules 208a, 208b such as mixers, filters and/or analog to digital controllers (ADCs).

Although the maximum ratio combiner 212 and the baseband processor 214 are illustrated as separate entities, the maximum ratio combiner 212 may be integrated as part of the baseband processor 214.

Although only two antennas 202a, . . . , 202n are shown for diversity, the invention is not limited in this regard. Accordingly, more than two antennas may be utilized without departing from the spirit and scope of the invention. The addition of more than two antennas utilizes additional processing paths in the diversity WiFi receiver 200.

Although a diversity WiFi receiver is illustrated, the invention is not limited to the use of the diversity WiFi receiver. Accordingly, various embodiments of the invention may utilize a non-diversity receiver without departing from the spirit and scope of the various embodiments of the invention.

Figure 3:
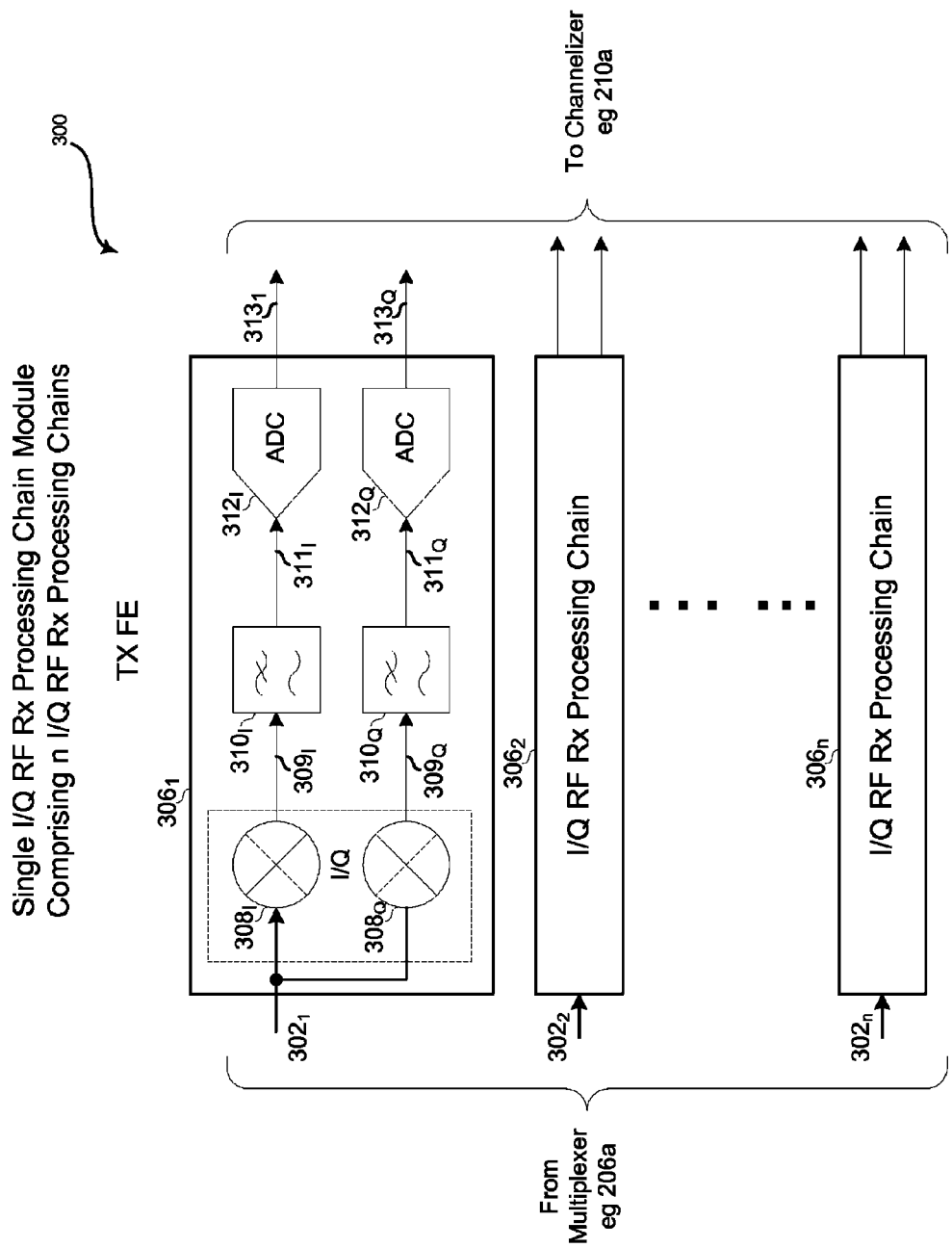
FIG. 3 is a block diagram of an exemplary I/Q RF receive processing chain module of a diversity WiFi receiver that utilizes full spectrum capture, in accordance with an embodiment of the invention.

FIG. 3 is a block diagram of an exemplary I/Q RF receive processing chain module of a diversity WiFi receiver that utilizes full spectrum capture, in accordance with an embodiment of the invention. Referring to FIG. 3, there is shown an I/Q RF receive processing chain module 300. The I/Q RF receive processing chain module 300 comprises a plurality of n I/Q RF receive processing chains, where n is an integer. The plurality of n I/Q RF receive processing chains are referenced as $306_1, 306_2, \ldots, 306_n$. Each of the n I/Q RF receive processing chains $306_1, 306_2, \ldots, 306_n$ are substantially similar.

The I/Q RF receive processing chains $306_1$ comprises an in-phase (I) path and a quadrature (Q) path. The in-phase path of the I/Q RF receive processing chains $306_1$ comprises a mixer $308_I$, a filter $310_I$, and an analog to digital converter (ADC) $312_I$. The quadrature path of the I/Q RF receive processing chains $306_1$ comprises a mixer $308_Q$, a filter $310_Q$, and an analog to digital converter (ADC) $312_Q$.

Each of the mixers $308_I$, $308_Q$ may comprise suitable logic, circuitry, interfaces and/or code that may be operable to mix the corresponding signal $302_1$ with a local oscillator signal (not shown) to generate the signal $309_I$, $309_Q$, respectively. The mixers $308_I$, $308_Q$ are operable to mix the signal $302_1$ with a pair of in-phase (I) and quadrature (Q) local oscillator signals, respectively, to generate the corresponding pair of in-phase and quadrature signals $309_I$, $309_Q$.

In some embodiments of the invention, the mixers in each of the I/Q RF receive processing chains may be operable to function with similar characteristics, and, in other embodiments of the invention, the mixers in each of the I/Q RF receive processing chains may be operable to function with different characteristics. For example, the mixers $308_I$, $308_Q$ may be configured to operate with a higher bandwidth than the mixers (not shown), which may be within the I/Q RF receive processing chain $306_2$. Similarly, the mixers (not shown), which may be within the I/Q RF receive processing chain $306_2$ may be configured to operate with a higher bandwidth than the mixers (not shown), which may be within the I/Q RF receive processing chain $306_n$, and the mixers $308_I$, $308_Q$, which may be within the I/Q RF receive processing chain $306_n$.

The phase and/or frequency of the local oscillator signals (not shown), which are input to the mixers in each of the I/Q RF receive processing chains $306_1, 306_2, \ldots, 306_n$, may be controlled via one or more signals from the baseband processor 214, which is illustrated in FIG. 2. In accordance with various embodiments of the invention, the phase and/or frequency of the local oscillator signals, which are input to the mixers in each of the I/Q RF receive processing chains $306_1, 306_2, \ldots, 306_n$, may be controlled by the baseband processor 214 based on which one or more WiFi channels and/or WiFi frequency bands are to be captured by the diversity WiFi receiver 200. The phase and/or frequency of the local oscillator signals, which are input to the mixers in each of the I/Q RF receive processing chains $306_1, 306_2, \ldots, 306_n$, may be generated from the LOGEN 209, which is illustrated in FIG. 2.

The filters in each of the I/Q RF receive processing chains $306_1, 306_2, \ldots, 306_n$ may comprise suitable logic, circuitry, interfaces and/or code that may be operable to filter out undesired frequencies/channels from the corresponding signals that are output from the oscillators in each of the I/Q RF receive processing chains $306_1, 306_2, \ldots, 306_n$. For example, each of the filters $310_I$, $310_Q$ in the I/Q RF receive processing chains $306_1$ may be operable to filter out undesired frequencies from the signals $309_I$, $309_Q$ to generate the corresponding analog signals $311_I$, $311_Q$.

In some embodiments of the invention, the filters in each of the I/Q RF receive processing chains $306_1, 306_2, \ldots, 306_n$ may be operable to function with similar characteristics, and, in other embodiments of the invention, the filters in each of the I/Q RF receive processing chains $306_1$, $306_2$, ..., $306_n$ may be operable to function with different characteristics. For example, the filters $310_I$, $310_Q$, which are within the I/Q RF receive processing chains $306_1$, may be configured to operate with a higher bandwidth than the filters (not shown), which may be within the I/Q RF receive processing chain $306_2$. Similarly, the filters (not shown), which may be within the I/Q RF receive processing chain $306_2$ may be configured to operate with a higher bandwidth than the mixers (not shown), which may be within the I/Q RF receive processing chain $306_n$, and the mixers $310_I$, $310_Q$, which may be within the I/Q RF receive processing chain $306_n$.

The ADCs in each of the I/Q RF receive processing chains $306_1$, $306_2$, ..., $306_n$ may comprise suitable logic, circuitry, interfaces and/or code that may be operable to convert the analog signals from the corresponding signals that are output from the filters in each of the I/Q RF receive processing chains $306_1$, $306_2$, ..., $306_n$. For example, each of the ADC $312_I$, $312_Q$ in the I/Q RF receive processing chains $306_1$ may be operable to convert the analog signals $311_I$, $311_Q$ to the corresponding digital signals $313_I$, $313_Q$. The ADCs may be preceded by a frequency conversion step and filtering to shift a higher frequency band to a lower frequency or baseband, where it is easier to design wideband data converters.

In some embodiments of the invention, the ADCs in each of the I/Q RF receive processing chains $306_1$, $306_2$, ..., $306_n$ may be operable to function with similar characteristics, and, in other embodiments of the invention, the ADCs in each of the I/Q RF receive processing chains $306_1$, $306_2$, ..., $306_n$ may be operable to function with different characteristics. For example, the ADCs $312_I$, $312_Q$, which are within the I/Q RF receive processing chains $306_1$, may be configured to operate with a higher bandwidth than the ADCs (not shown), which may be within the I/Q RF receive processing chain $306_2$. Similarly, the ADCs (not shown), which may be within the I/Q RF receive processing chain $306_2$ may be configured to operate with a higher bandwidth than the ADCs (not shown), which may be within the I/Q RF receive processing chain $306_n$, and the ADC $310_I$, $310_Q$, which may be within the I/Q RF receive processing chain $306_n$.

In operation, the diversity WiFi receiver 200 may be configured to capture a specified number of WiFi channels. In this regard, the baseband processor 214 may be operable to configure the multiplexer that feeds the I/Q RF receive processing chains $306_1$, $306_2$, ..., $306_n$ to select and enable a corresponding number of the I/Q RF receive processing chains $306_1$, $306_2$, ..., $306_n$, which are to be utilized to handle reception and demodulation of the specified number of WiFi channels. In some embodiments of the invention, only those I/Q RF receive processing chains $306_1$, $306_2$, ..., $306_n$ which are selected by the processor are powered and any remaining ones of the I/Q RF receive processing chains $306_1$, $306_2$, ..., $306_n$ that are not selected are powered down.

Figure 4:
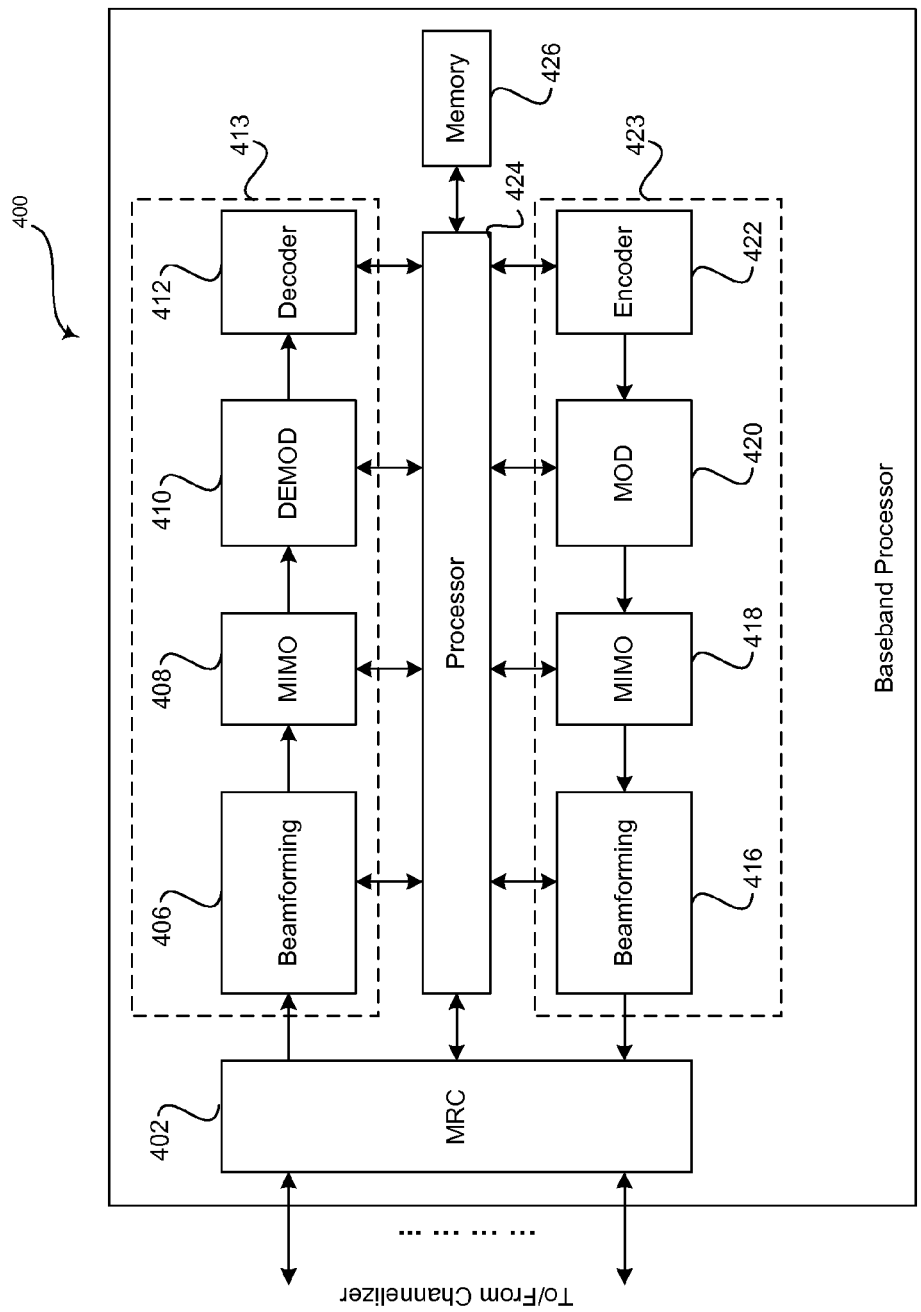
FIG. 4 is a block diagram of an exemplary baseband processor, in accordance with an embodiment of the invention.

FIG. 4 is a block diagram of an exemplary baseband processor, in accordance with an embodiment of the invention. Referring to FIG. 4, there is shown a baseband processor 400. The baseband processor 400 may comprise a MRC module 402, a beamforming module 406, a MIMO module 408, a demodulator module 410, a decoder 412, a beamforming module 416, a MIMO module 418, a modulator module 420, a encoder 422, a processor 424 and memory 426. The baseband processor 400 may be substantially similar to the baseband processor 200, which is illustrated and described with respect to FIG. 2. The MRC module 402, the beamforming module 406, the MIMO module 408, the demodulator module 410 and the decoder 412 may comprise a demodulation path 413. The beamforming module 416, the MIMO module 418, the modulator module 420, the encoder 422 may comprise a modulation path 423.

The MRC module 402 may comprise suitable logic, circuitry, interfaces and/or code that may be operable to channels that are output from the channelizers 210a, 210b. For example, maximum ratio combiner 212 may be operable to utilize, for example, a coarse FFT processing that employs a low complexity diversity using coarse FFT and subband-wise combining. The coarse FFT processing may optimally combine the signals from a plurality of frequency bins for multiple antennas and accordingly, generate an improved maximum ratio combined (MRC) co-phased signals. The maximum ratio combiner 402 may also be operable to utilize channel stacking and/or band stacking for the plurality of frequency bins.

The beamforming module 406 may comprise suitable logic, circuitry, interfaces and/or code that may be operable to utilize one or more beamforming algorithms to process signals from the plurality of antennas 202a, ..., 202n.

The MIMO module 408 may comprise suitable logic, circuitry, interfaces and/or code that may be operable to utilize one or more MIMO algorithms (e.g., as defined or supported by 802.11n or 802.11ac) to process signals from the beamforming module 406 for plurality of antennas 202a, ..., 202n.

The demodulator module 410 may comprise suitable logic, circuitry, interfaces and/or code that may be operable to demodulate the signals from the MIMO module 408.

The decoder 412 may comprise suitable logic, circuitry, interfaces and/or code that may be operable to decode the resulting demodulated signals from the demodulator module 410.

The encoder 422 may comprise suitable logic, circuitry, interfaces and/or code that may be operable to encode data to be transmitted utilizing one or more encoding algorithms.

The modulator module 420 may comprise suitable logic, circuitry, interfaces and/or code that may be operable to may be utilized to modulate the resulting encoded output from the encoder 422.

The MIMO module 418 may comprise suitable logic, circuitry, interfaces and/or code that may be operable to utilize one or more MIMO algorithms to process signals for transmission via the plurality of antennas 202a, ..., 202n.

The beamforming module 416 may comprise suitable logic, circuitry, interfaces and/or code that may be operable to utilize one or more beamforming algorithms to process signals from the MIMO module 418 for transmission via the plurality of antennas 202a, ..., 202n.

The processor 424 may comprise suitable logic, circuitry, interfaces and/or code that may be operable to control operation of the FSC WiFi receiver 200. In this regard, the processor 424 may be operable to control the components within the FSC receiver module and the baseband processor.

The memory 426 may comprise suitable logic, circuitry, interfaces and/or code that may be operable to store operating code, operating data and configuration settings. The memory 426 may be operable to store information that may be utilized to control operation of one or more of the components in the FSC receiver module and the baseband processor of the FSC WiFi receiver.

In operation, the signals received by the full spectrum capture transceiver 140 are channelized and the MIMO module 408 is operable to synthesize MIMO channels from all the captured WiFi channels. The architecture of the full spectrum capture transceiver 140 enables, for example, one of the WiFi channels to be pulled out and all of the bandwidth for those particular WiFi channels may be assigned to a particular WiFi enabled communication device. In other words, in instances where there are a plurality of WiFi enabled communication devices, the full spectrum capture transceiver 140 may be operable to assign each of the plurality of WiFi enabled communication devices its own dedicated WiFi channel. In this regard, there is no need for a plurality of WiFi enabled communication devices to share a particular WiFi AP channel. The number of WiFi enabled communication devices to which the channels may be assigned may be dependent on or limited by the number of demodulators that are available, for example, in the full spectrum capture transceiver 140.

In accordance with an embodiment of the invention, based on the architecture of the full spectrum capture transceiver 140, in order to double the capacity, twice the number of channels may be channelized by the full spectrum capture transceiver 140 and assigned to the client WiFi enabled communication devices. Accordingly, there is no need to modify the architecture of the client WiFi enabled communication devices. In other words, only the access point/router needs to be modified. The full spectrum capture transceiver 140 provides a flexible and scalable architecture to increase capacity without having to modify the WiFi enabled communication devices or having to add complexity to the Access point and/or router.

In accordance with various embodiments of the invention, certain traffic may be assigned to certain channels based on various criteria. For example, a user of a client WiFi enabled communication device that is surfing the Web may be assigned to one channel, and another user of a client WiFi enabled communication device that may be a watching HD video content may be assigned to another channel, and so on. Different bandwidth channels may be assigned to different client WiFi enabled communication devices based on bandwidth requirements. In conventional WiFi APs, in order for a user to get dedicated WiFi channels, that user would have to upgrade the AP to an 802.11ac compliant WiFi AP. However, the full spectrum capture transceiver 140 is operable to provide dedicated channel usage and channels may be assigned based on the type of traffic or class of traffic that is being handled. In effect, the full spectrum capture transceiver 140 is operable to provide 802.11ac capabilities without the need to actually utilize an 802.11ac communication device. The full spectrum capture transceiver 140 allows adaptive and dynamic sensing of the channels to determine which ones are being utilized or are unusable or impaired due to fading, interference or noise, and those channels can be avoided or marked as bad. Those channels that are usable or are not impaired and may therefore be selected and allocated for use. Accordingly, the full spectrum capture transceiver 140 may be referred to as a WiFi Turbocharger.

One major advantage of utilizing full spectrum capture with WiFi is that only the APs need to be upgraded and not the client WiFi enabled communication mobile devices. This is a win situation for consumers in that they do not need to upgrade their WiFi enabled laptops or other client WiFi enabled communication devices to take full advantage of the various features and functions provided by FSC with WiFi. Accordingly, network providers may upgrade the network infrastructure without having to worry about end-users upgrading their WiFi enabled communication devices.

The use of multiple WiFi channels by the full spectrum capture transceiver 140 may provide power savings. Duty cycling across a plurality of WiFi channels may provide power savings as opposed to sending a significant amount of data across a single WiFi channel. The full spectrum capture transceiver 140 may be operable to transmit data in a burst mode, after which, the full spectrum capture transceiver 140 goes to sleep. The sleep and wake modes may be dependent on, for example, WiFi beacon timing. The WiFi enabled communication devices may burst data, for example, in a round-robin time division manner across a plurality of WiFi channels assigned by the full spectrum capture transceiver 140. The full spectrum capture transceiver 140 may configure and assign multiple channels and the WiFi enabled communication devices may be operable to burst data across the assigned WiFi channels in a synchronous manner. The WiFi receivers may be shut down or enter a low power mode in instances when the WiFi transmitter is not bursting data or when the WiFi receivers may be consuming content that was previously received in a burst. In one example, a WiFi enabled communication device's transceiver circuit may enter a low power mode when it is not communicating video and the device's transceiver circuit may enter a sleep mode when it is consuming received content. In another example, the WiFi enabled communication device may receive 2 seconds worth of video and send acknowledgements and then shut down the RF front-end circuits in the FSC WiFi receiver when the FSC WiFi receiver is consuming the 2 seconds worth of video. The full spectrum capture WiFi AP and/or router may be operable to store timing offset information for each of the WiFi enabled communication devices in order to provide multi-channel synchronicity, which enables seamless switching between channels.

Figure 5:
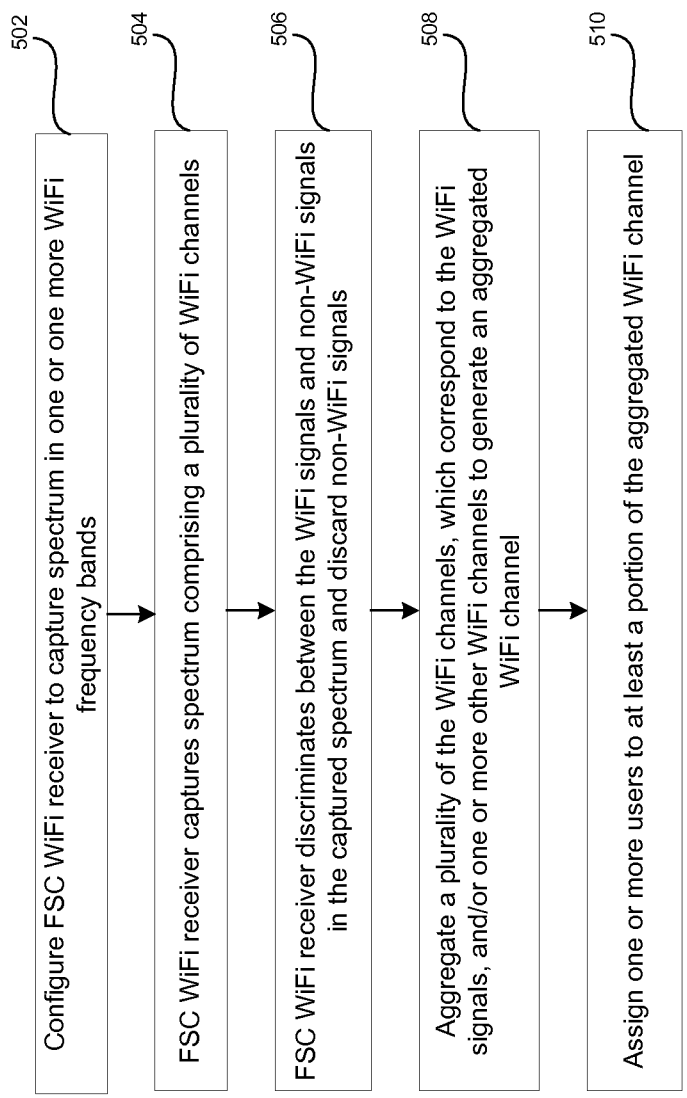
FIG. 5 is a flow chart illustrating exemplary steps for receiving and processing WiFi signals utilizing a full spectrum capture WiFi access point, in accordance with an embodiment of the invention.

FIG. 5 is a flow chart illustrating exemplary steps for receiving and processing WiFi signals utilizing a full spectrum capture WiFi device (e.g., access point), in accordance with an embodiment of the invention. Referring to FIG. 5, there is shown exemplary steps 502 through 510. In step 502, an FSC WiFi access point is configured to capture spectrum in one or more WiFi frequency bands. In step 504, the FSC WIFI access point captures the spectrum comprising a plurality of WiFi channels. In step 506, the WiFi access point discriminates between the WiFi signals and non-WiFi signals in the captured spectrum and discard non-WiFi signals. In step 508, the FSC WiFi access point is operable to aggregate a plurality of the WiFi channels, which correspond to the WiFi signals, and/or one or more other WiFi channels to generate an aggregated WiFi channel. In step 510, the FSC WiFi access point may be operable to assign one or more users to at least a portion of the aggregated WiFi channel.

Figure 6:
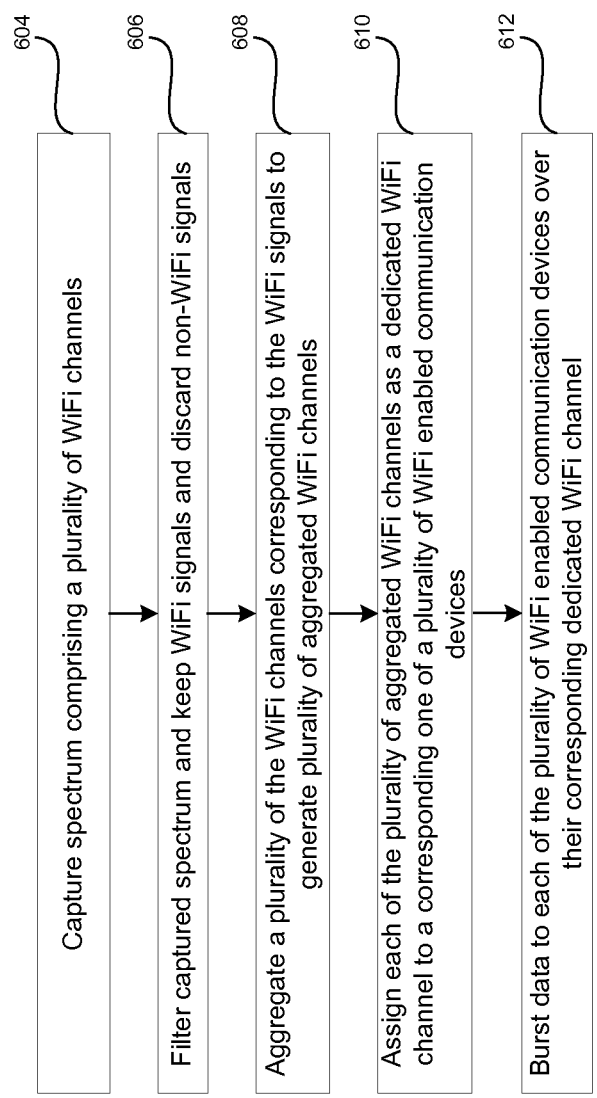
FIG. 6 is a flow chart illustrating exemplary steps for receiving and processing WiFi signals utilizing a full spectrum capture WiFi access point, in accordance with an embodiment of the invention.

FIG. 6 is a flow chart illustrating exemplary steps for receiving and processing WiFi signals utilizing a full spectrum capture WiFi device (e.g., access point), in accordance with an embodiment of the invention. Referring to FIG. 6, there is shown exemplary steps 604 through 612. In step 604, a FSC WIFI access point captures the spectrum comprising a plurality of WiFi channels. In step 606, the WiFi access point filters the captured spectrum and keeps the WiFi signals and discards the non-WiFi signals. In step 608, the FSC WiFi access point is operable to aggregate a plurality of the WiFi channels corresponding to the WiFi signals to generate plurality of aggregated WiFi channels. In step 610, the FSC WiFi access point may be operable to assign each of the plurality of aggregated WiFi channels as a dedicated WiFi channel to a corresponding one of a plurality of WiFi enabled communication devices. In step 612, FSC WiFi access point may be operable to Burst data to each of the plurality of WiFi enabled communication devices over their corresponding dedicated WiFi channel.

While the discussion with respect to FIG. 5 and FIG. 6 specifically reference an access point, the functionality described can be employed by any WiFi enabled communication device (such as, for example, a client device providing WiFi connectivity to other client devices).

Figure 7:
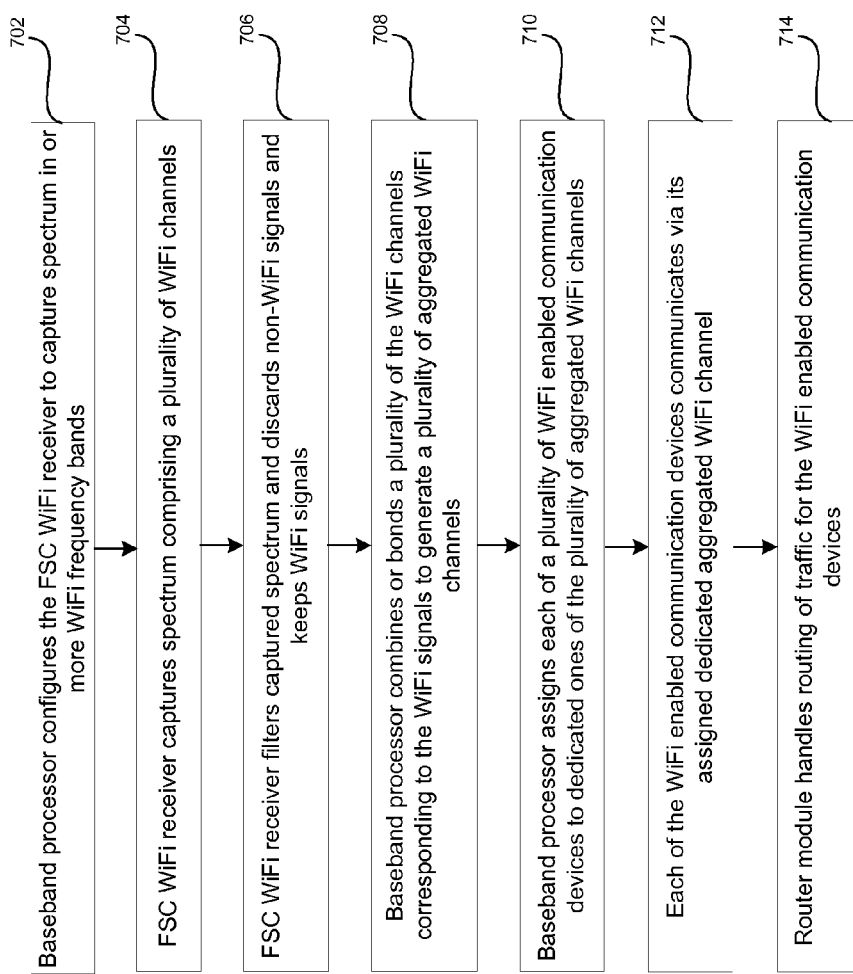
FIG. 7 is a flow chart illustrating exemplary steps for receiving and processing WiFi signals utilizing a full spectrum capture WiFi access point/router, in accordance with an embodiment of the invention.

FIG. 7 is a flow chart illustrating exemplary steps for receiving and processing WiFi signals utilizing a full spectrum capture WiFi access point or router, in accordance with an embodiment of the invention. Referring to FIG. 7, there is shown exemplary steps 702 through 714. In step 702, the baseband processor configures the FSC WiFi receiver to capture spectrum in or more WiFi frequency bands. In step 704, the FSC WiFi receiver captures spectrum comprising a plurality of WiFi channels. In step 706, FSC WiFi receiver filters captures spectrum and discards non-WiFi signals and keeps WiFi signals. In step 708, the baseband processor combines or bonds a plurality of the WiFi channels corresponding to the WiFi signals to generate a plurality of aggregated WiFi channels. In step 710, the baseband processor assigns each of a plurality of WiFi enabled communication devices to dedicated ones of the plurality of aggregated WiFi channels. In step 712, each of the WiFi enabled communication devices is operable to communicate via its assigned dedicated aggregated WiFi channel. In step 714, the router module handles routing of traffic for the WiFi enabled communication devices.

In accordance with various embodiments of the invention, a single FSC WiFi receiver 140 is operable to utilize full spectrum capture to capture signals over a wide spectrum comprising a plurality of WiFi frequency bands, extract one or more WiFi channels from said captured signals and aggregate a plurality of blocks of said WiFi channels to create one or more aggregated WiFi channels. The WiFi frequency bands may comprise a 2.4 GHz WiFi frequency band and a 5 GHz WiFi frequency band. The single FSC WiFi receiver 140 is operable to aggregate a plurality of blocks of the WiFi channels from contiguous blocks of spectrum and/or non-contiguous blocks of spectrum in one or more of the plurality of WiFi frequency bands, for example, 2.4 GHz and 5 GHz. The single FSC WiFi receiver is operable to filter out one or more non-WiFi channels from the captured signals to leave only the WiFi channels. The single FSC WiFi receiver is operable to assign one or more aggregated WiFi channels to one or more WiFi enabled communication devices. At least a portion of the one or more aggregated WiFi channels may be dynamically assigned to one or more other WiFi enabled communication devices.

The single FSC WiFi receiver 140 is also operable to dynamically adjust a bandwidth of one or more processing lanes in order to handle channels of varying bandwidth. The single FSC WiFi receiver 140 may also duty cycle operation of one or more processing lanes within the single receiver. A plurality of processing lanes within the single receiver may be assigned as a broadcast lane for handling high bandwidth traffic. One or more processing lanes within the single FSC WiFi receiver 140 may be assigned as a common lane for handling low bandwidth traffic and/or control traffic.

In accordance with various embodiments of the invention, a WiFi access point or router 150 includes a receive radio frequency (RF) front end 154 and a baseband processor 160 that controls operation of the receive RF front end 154. The RF front end 154 captures signals over a wide spectrum that includes a plurality of WiFi frequency bands (2.4 GHz and 5 GHz) and channelizes one or more WiFi channels from the captured signals. The baseband processor 160 combines a plurality of blocks of WiFi channels to create one or more aggregated WiFi channels. The blocks of WiFi channels may comprise the extracted one or more WiFi channels and/or other WiFi channels. The receive RF front end 154 may be integrated on a first integrated circuit 178 and the baseband processor may be integrated on a second integrated circuit 177. The first and second integrated circuits 178, 177 may be integrated on a single package 176. The RF front end 154 and the baseband processor 160 may be integrated on a single integrated circuit. 173

The WiFi access point comprises a routing module 170 that is communicatively coupled to the baseband processor 160. The baseband processor 160 may diversity process the channelized one or more WiFi channels and duty cycle communication traffic across a plurality of the aggregated WiFi channels. The baseband processor 160 may assign one of the aggregated WiFi channels as a dedicated channel for handling traffic for a WiFi enabled communication device. The baseband processor 160 may dynamically reassign the assigned one of the aggregated WiFi channels as a dedicated channel for handling traffic for another WiFi enabled communication device. The WiFi access point comprises a transmit RF front end that is operable to transmit signals over a wide spectrum comprising said one or more WiFi frequency bands.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for WiFi access point utilizing full spectrum capture.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    an integrated circuit for use in a wireless access point, the integrated circuit comprising a full spectrum capture receiver and a processor, wherein:
        said full spectrum capture receiver is operable to:
            concurrently capture and digitize a range of frequencies encompassing each of a first two or more discontiguous channels assigned to a first user device, and a second two or more discontiguous channels assigned to a second user device; and
            select each of said first two or more discontiguous channels and said second two or more discontiguous channels for output;
        said processor is operable to:
            combine said selected first two or more discontiguous channels from said full spectrum capture receiver to form a first aggregate channel;
            demodulate said first aggregate channel to recover data from said first user device;
            combine said selected second two or more discontiguous channels from said full spectrum capture receiver to form a second aggregate channel; and
            demodulate said second aggregate channel to recover data from said second user device.

2. The system of claim 1, wherein said processor is operable to generate a per-user spectral map that indicates, for each of said first user device and said second user device, the quality of each channel in said range of frequencies.

3. The system of claim 2, wherein said processor is operable to:
    detect one or more characteristics of said each channel in said range of frequencies; and
    generate said per-user spectral map based on said detected one or more characteristics.

4. The system according to claim 3, wherein said determined one or more characteristics comprise noise, interference, fading and blocker information.

5. The system according to claim 3, wherein said determined one or more characteristics comprise noise, interference, fading and blocker information.

6. The system of claim 2, comprising:
    detecting, by said processor, one or more characteristics of said each channel in said range of frequencies; and
    generating, by said processor, said per-user spectral map based on said sensed one or more characteristics.

7. The system of claim 1, wherein said processor is operable to use said per-user spectral map for assignment of said first two or more discontiguous channels to said first user device and assignment of said second two or more discontiguous channels to said second user device.

8. The system of claim 1, wherein said full spectrum capture receiver comprises a plurality of radio frequency receive processing chains and a plurality of channelizers.

9. The system of claim 8, wherein said processor is operable to:
    receive a first version of said selected first two or more discontiguous channels from a first of said channelizers and a second version of said selected first two or more discontiguous channels from a first of said channelizers; and
    diversity combine said first version of said selected first two or more discontiguous channels and said second version of said selected first two or more discontiguous channels.

10. The system of claim 1, wherein said processor is operable to:
    designate a first aggregate channel generated from two or more channels in said range of frequencies as a broadcast lane; and
    designate a second aggregate channel generated from two or more channels in said range of frequencies as a common lane.

11. The system of claim 1, wherein said range of frequencies is the 2.4 GHz industrial, scientific, and medical band.

12. The system of claim 1, wherein said range of frequencies is the 5.8 GHz industrial, scientific, and medical band.

13. The system of claim 1, comprising assigning, by said processor, said first two or more discontiguous channels to said first user device and said second two or more discontiguous channels to said second user device based on said per-user spectral map.

14. The system of claim 1, comprising
    receiving, by said processor, a first version of said selected first two or more discontiguous channels from a first of said channelizers and a second version of said selected first two or more discontiguous channels from a first of said channelizers; and
    diversity combining, by said processor, said first version of said selected first two or more discontiguous channels and said second version of said selected first two or more discontiguous channels.

15. The system of claim 1, comprising:
    designating, by said processor, a first aggregate channel generated from two or more channels in said range of frequencies as a broadcast lane; and
    designating, by said processor, a second aggregate channel generated from two or more channels in said range of frequencies as a common lane.

16. The system of claim 1, wherein said range of frequencies is the 2.4 GHz industrial, scientific, and medical band.

17. The system of claim 1, wherein said range of frequencies is the 5.8 GHz industrial, scientific, and medical band.

18. A method comprising:
concurrently capturing and digitizing, by a full spectrum capture receiver of an integrated circuitry for use in a wireless access point, a range of frequencies encompassing each of a first two or more discontiguous channels assigned to a first user device, and a second two or more discontiguous channels assigned to a second user device; and
selecting, by said full spectrum capture receiver, each of said first two or more discontiguous channels and said second two or more discontiguous channels for output;
combining, by a processor of said integrated circuitry for use in a wireless access point, said selected first two or more discontiguous channels from said full spectrum capture receiver to form a first aggregate channel;
demodulating, by said processor, said first aggregate channel to recover data from said first user device;
combining, by said processor, said selected second two or more discontiguous channels from said full spectrum capture receiver to form a second aggregate channel; and
demodulating, by said processor, said second aggregate channel to recover data from said second user device.

19. The method of claim 18, comprising generating, by said processor, a per-user spectral map that indicates, for each of said first user device and said second user device, the quality of each channel in said range of frequencies.

* * * * *